(12) United States Patent
Tuckey (10) Patent No.: US 12,471,720 B2
(45) Date of Patent: Nov. 18, 2025

(54) FOLDABLE BASSINET (71) Applicant: Wonderland Switzerland AG, Steinhausen (CH)

(72) Inventor: Peter R. Tuckey, Leola, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/581,737

(22) Filed: Feb. 20, 2024

(65) Prior Publication Data
US 2024/0188728 A1 Jun. 13, 2024

Related U.S. Application Data (60) Continuation of application No. 17/199,474, filed on Mar. 12, 2021, now Pat. No. 11,910,936, which is a (Continued)

(51) Int. Cl.
*A47D 9/00* (2006.01)
*A47D 15/00* (2006.01)

(52) U.S. Cl.
CPC ........... *A47D 9/005* (2013.01); *A47D 15/003* (2013.01)

(58) Field of Classification Search
CPC ...... A47D 9/005; A47D 15/003; A47D 7/002; A47D 7/005; B62B 7/00
(Continued)

(56) References Cited

U.S. PATENT DOCUMENTS 1,530,116 A * 3/1925 Hawkins ................ A47D 9/008
5/129
2,617,999 A * 11/1952 Mitchell ................ A47D 9/005
5/99.1
(Continued)

FOREIGN PATENT DOCUMENTS

CN 2922647 Y 7/2007
CN 102396926 A 4/2012
(Continued)

OTHER PUBLICATIONS

Notice of Allowance issued in counterpart Chinese Patent Application No. 201910128012, dated Dec. 12, 2022.
(Continued)

*Primary Examiner* — Amber R Anderson
*Assistant Examiner* — Luke Hall
(74) *Attorney, Agent, or Firm* — Volpe Koenig (57) ABSTRACT A foldable bassinet including a top rail assembly, at least one first hinge assembly disposed on the top rail assembly, at least one second hinge assembly rotatably combined with the at least one first hinge assembly, at least one leg assembly connected to the at least one second hinge assembly, and at least one latch assembly movably disposed on the at least one second hinge assembly. The at least one first hinge assembly includes an engaging surface. The at least one leg assembly being foldable relative to the top rail assembly by rotation of the at least one second hinge assembly relative to the at least one first hinge assembly. The at least one latch assembly including an engaging component movably connected to the at least one second hinge assembly, the engaging component engaging with the engaging surface to restrain the rotation of the at least one second hinge assembly.

20 Claims, 11 Drawing Sheets

Related U.S. Application Data division of application No. 16/278,739, filed on Feb. 19, 2019, now Pat. No. 11,478,087.

(60) Provisional application No. 62/632,641, filed on Feb. 20, 2018.

(58) Field of Classification Search
USPC .................................................... 5/102
See application file for complete search history.

(56) References Cited

U.S. PATENT DOCUMENTS

| | | | | |
|---|---|---|---|---|
| 2,783,481 A * | 3/1957 | Moriarty | A47D 7/00 | 296/210 |
| 3,564,564 A * | 2/1971 | Paine | B64G 1/641 | 24/523 |
| 4,144,822 A * | 3/1979 | Roberts | A47B 3/0815 | 108/125 |
| 5,142,739 A * | 9/1992 | Lin | E05D 11/1007 | 16/326 |
| 5,615,427 A * | 4/1997 | Huang | A47D 13/063 | 5/98.1 |
| 5,971,476 A * | 10/1999 | Gibson | B60N 2/2845 | 297/250.1 |
| 6,021,636 A * | 2/2000 | Johnson | E05B 81/10 | 244/110 B |
| 6,386,986 B1 | 5/2002 | Sonner et al. | | |
| 6,594,840 B2 * | 7/2003 | Tomas | A47D 13/107 | 5/655 |
| 8,960,104 B2 * | 2/2015 | Copeland | A47B 9/00 | 108/5 |
| 2003/0106149 A1 * | 6/2003 | Hsia | A47D 9/005 | 5/99.1 |
| 2004/0100115 A1 * | 5/2004 | Rhodes | B60N 2/307 | 296/65.09 |
| 2005/0211529 A1 * | 9/2005 | Hirtsiefer | E05C 17/345 | 192/223 |
| 2005/0241064 A1 * | 11/2005 | Lopes | A47D 9/016 | 5/655 |
| 2006/0237944 A1 | 10/2006 | Thomson et al. | | |
| 2008/0000023 A1 | 1/2008 | Chen et al. | | |
| 2008/0023603 A1 * | 1/2008 | Michaud | E05D 13/006 | 248/222.51 |
| 2010/0187041 A1 * | 7/2010 | Crouch | A47D 15/003 | 182/223 |
| 2012/0034985 A1 | 2/2012 | Zhang | | |
| 2012/0204347 A1 * | 8/2012 | Li | A47D 9/005 | 5/93.1 |
| 2012/0235103 A1 * | 9/2012 | Greger | A47D 9/005 | 256/25 |
| 2013/0205496 A1 * | 8/2013 | Cheng | A47D 13/063 | 5/99.1 |
| 2013/0326808 A1 * | 12/2013 | Saint | A47D 9/016 | 5/93.1 |
| 2014/0283298 A1 * | 9/2014 | Cheng | A47D 9/005 | 5/111 |
| 2015/0047122 A1 * | 2/2015 | Ingram | A47D 13/063 | 5/98.1 |
| 2015/0157140 A1 * | 6/2015 | Yang | A47D 1/00 | 224/159 |
| 2015/0216322 A1 * | 8/2015 | Longenecker | A47D 9/005 | 5/99.1 |
| 2015/0289674 A1 | 10/2015 | Winterhalter | | |
| 2015/0313375 A1 | 11/2015 | Horst | | |
| 2016/0000232 A1 * | 1/2016 | Horst | A47D 5/00 | 5/655 |
| 2016/0042768 A1 * | 2/2016 | Yang | G11B 33/005 | 403/322.4 |
| 2018/0146796 A1 * | 5/2018 | Longenecker | A47D 9/005 | |

FOREIGN PATENT DOCUMENTS

| | | | | |
|---|---|---|---|---|
| CN | 102687961 A | 9/2012 | | |
| CN | 103462412 A | 12/2013 | | |
| CN | 103565166 A | 2/2014 | | |
| CN | 203693076 U | 7/2014 | | |
| CN | 105286378 A | 2/2016 | | |
| CN | 105310347 A | 2/2016 | | |
| CN | 106263817 A * | 1/2017 | | A47D 7/005 |
| CN | 206534415 U | 10/2017 | | |
| CN | 107374168 A | 11/2017 | | |
| EP | 2614754 A1 | 7/2013 | | |
| GB | 201006355 | 6/2010 | | |
| GB | 2469579 A | 10/2010 | | |
| GB | 2505078 A | 2/2014 | | |
| GB | 2565408 A | 2/2019 | | |
| WO | 2017042953 A1 | 3/2017 | | |

OTHER PUBLICATIONS

Examination Report issued in counterpart GB Application No. GB2218030.1, dated Jan. 27, 2023.

Office Action issued in corresponding Chinese Patent Application No. 20910128012.5 on Jun. 29, 2022, consisting of 17 pp.

* cited by examiner

FOLDABLE BASSINET

CROSS REFERENCE TO RELATED APPLICATIONS

This application is a continuation application of U.S. patent application Ser. No. 17/199,474, filed on Mar. 12, 2021, which is a divisional application of U.S. patent application Ser. No. 16/278,739, filed on Feb. 19, 2019, now U.S. Pat. No. 11,478,087, issued on Oct. 25, 2022, which claims the benefit of U.S. Provisional Patent Application No. 62/632,641, filed on Feb. 20, 2018, the contents of which are hereby incorporated by reference in their entirety.

BACKGROUND OF THE INVENTION

1. Field of the Invention

The present invention relates to a child product, and more particularly, to a foldable bassinet which can be folded conveniently.

2. Description of the Prior Art

With development of economy and advancement of technology, there are more and more consumer goods available in the market for bringing convenience in people's lives. A bassinet is one of these consumer goods and for providing a sleeping area for a child.

It is well known that a conventional bassinet usually includes a frame and a soft good, such as a cloth component or a fabric component. The frame includes a top rail and four supporting legs. The soft good is secured to the top rail and the four supporting legs. The four supporting legs are respectively movably connected to four corners of the top rail and are foldable relative to the top rail, so as to facilitate a caregiver to share a room with a child. However, in order to prevent the soft good from forming a triangle which resists folding actions of the supporting legs, the four supporting legs must be configured to be folded individually inwardly toward a center of the bassinet, which is not convenient in use.

Therefore, there is a need to provide an improved foldable bassinet with convenient folding operation.

SUMMARY OF THE INVENTION

An objective of the present invention is to provide a foldable bassinet which can be folded conveniently for solving the aforementioned problem.

In order to achieve the aforementioned objective, the present invention discloses a foldable bassinet including a top rail assembly, at least one first hinge assembly, at least one second hinge assembly, at least one leg assembly and at least one latch assembly. The at least one first hinge assembly is combined with the top rail assembly. An engaging protrusion protrudes from the at least one first hinge assembly. The at least one second hinge assembly is rotatably combined with the at least one first hinge assembly. The at least one leg assembly is connected to the at least one second hinge assembly. The at least one leg assembly is foldable relative to the top rail assembly by rotation of the at least one second hinge assembly relative to the at least one first hinge assembly. The at least one latch assembly is movably disposed on the at least one second hinge assembly and includes an engaging component pivotally disposed on the at least one second hinge assembly for engaging with the engaging protrusion. The engaging component engages with the engaging protrusion to restrain the rotation of the at least one second hinge assembly relative to the at least one first hinge assembly when the at least one leg assembly is unfolded relative to the top rail assembly to an upright position.

According to an embodiment of the present invention, the engaging component includes an operating portion, a pivoting portion and an engaging portion. The pivoting portion is connected to and located between the operating portion and the engaging portion. The pivoting portion is pivoted to the at least one second hinge assembly. An engaging notch is formed on the engaging portion. The operating portion is at least partially exposed out of the at least one second hinge assembly, and the operating portion is configured to be operated to pivot the pivoting portion so as to drive the engaging notch to engage with or disengage from the engaging protrusion.

According to an embodiment of the present invention, the at least one latch assembly further includes a recovering component abutting between the at least one second hinge assembly and the engaging component to bias the engaging component to engage with the engaging protrusion.

According to an embodiment of the present invention, the recovering component is a torsional spring.

According to an embodiment of the present invention, the at least one first hinge assembly is received inside the at least one second hinge assembly.

According to an embodiment of the present invention, the at least one second hinge assembly includes a first outer housing and a second outer housing detachably connected to the first outer housing. A first receiving chamber is formed between the first outer housing and the second outer housing, and the at least one first hinge assembly is received inside the first receiving chamber.

According to an embodiment of the present invention, at least one hinge section is formed on the top rail assembly and includes a longitudinal axis. The at least one hinge section is sheathed in the at least one first hinge assembly, and the at least one second hinge assembly is rotatable relative to the at least one first hinge assembly around the longitudinal axis.

According to an embodiment of the present invention, an interface surface of the first receiving chamber and an interface surface of the at least one first hinge assembly are formed in arc shapes around the longitudinal axis and contact with each other.

According to an embodiment of the present invention, an abutting surface of the first receiving chamber abuts against an abutting surface of the at least one first hinge assembly when the at least one leg assembly is unfolded relative to the top rail assembly to the upright position.

According to an embodiment of the present invention, the first hinge assembly includes a first portion having a first radius and a second portion having a second radius greater than the first radius. An exposing window is formed on the first outer housing and communicated with the first receiving chamber The second portion is exposed out of the exposing window when the at least one leg assembly is folded relative to the top rail assembly to a folded position.

According to an embodiment of the present invention, the at least one second hinge assembly includes a first outer housing and a second outer housing detachably connected to the first outer housing. A first receiving chamber and at least one second receiving chamber are formed between the first outer housing and the second outer housing. The at least one first hinge assembly is received inside the first receiving chamber, and the at least one leg assembly is received inside the at least one second receiving chamber.

According to an embodiment of the present invention, two second receiving chambers are formed between the first outer housing and the second outer housing. The at least one leg assembly includes two leg components, and upper ends of the two leg components are received inside the two corresponding second receiving chambers respectively.

According to an embodiment of the present invention, the at least one first hinge assembly and the top rail assembly are combined with each other to cooperatively form an integral structure.

According to an embodiment of the present invention, the top rail assembly includes at least one tube component. The at least one first hinge assembly is combined with a central portion of the at least one tube component. The at least one leg assembly includes two leg components, and the two leg components are connected to the at least one second hinge assembly.

In summary, the present invention utilizes the first hinge assembly and the second hinge assembly to connect the two leg components of the leg assembly to the top rail assembly. Therefore, the two leg components of the leg assembly can be folded relative to the top tail assembly together by the rotation of the second hinge assembly relative to the first hinge assembly, which effectively prevents a soft good from forming a triangle which resists a folding action of the leg assembly and brings convenience in use. Besides, the present invention further utilizes the latch assembly to restrain or allow the rotation of the second hinge assembly relative to the first hinge assembly. Therefore, it allows a caregiver to fold the two leg components of the leg assembly easily by operating the latch assembly, which brings convenience in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
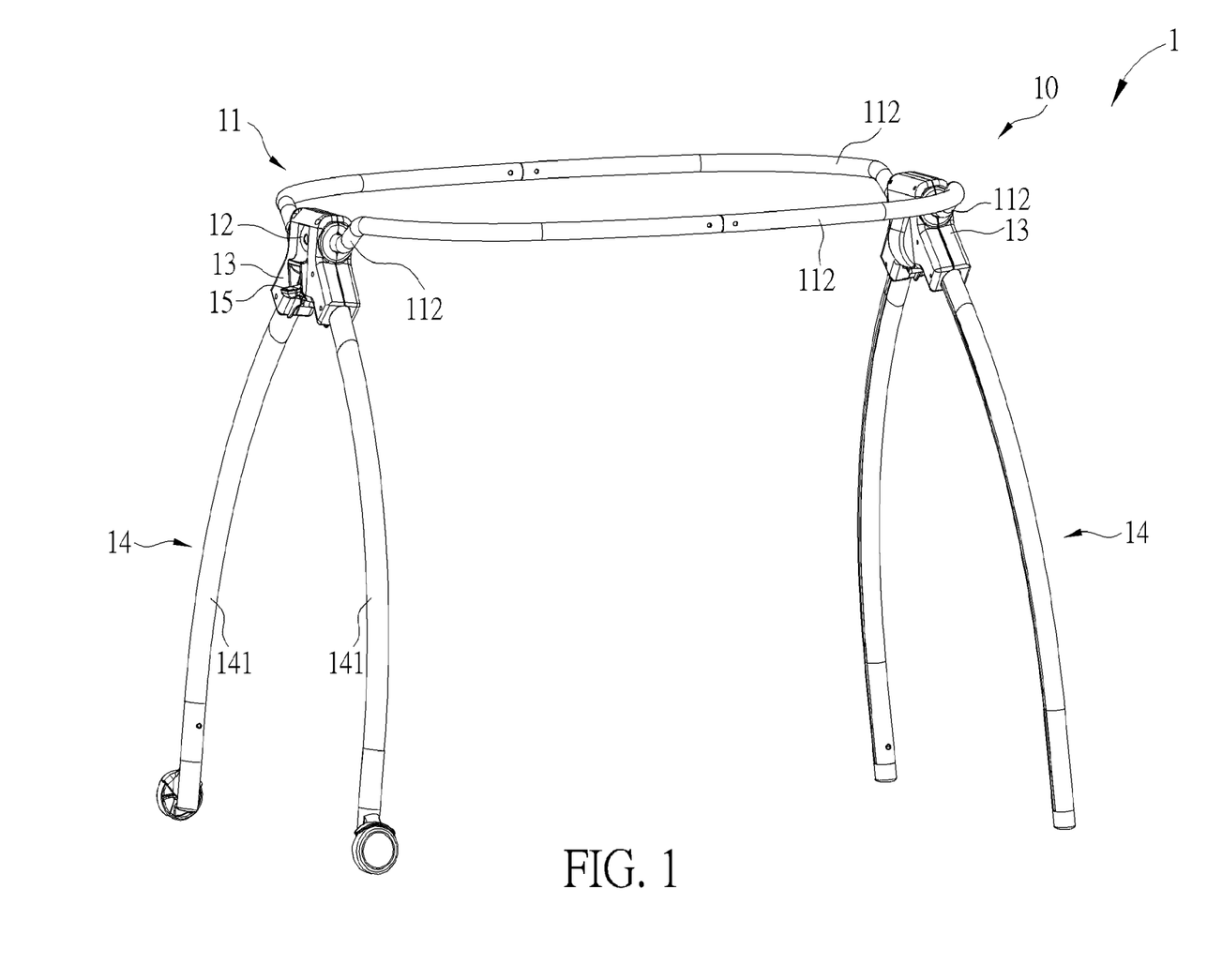
FIG. 1 is a schematic diagram of a foldable bassinet in an unfolded state according to a first embodiment of the present invention.
Figure 2:
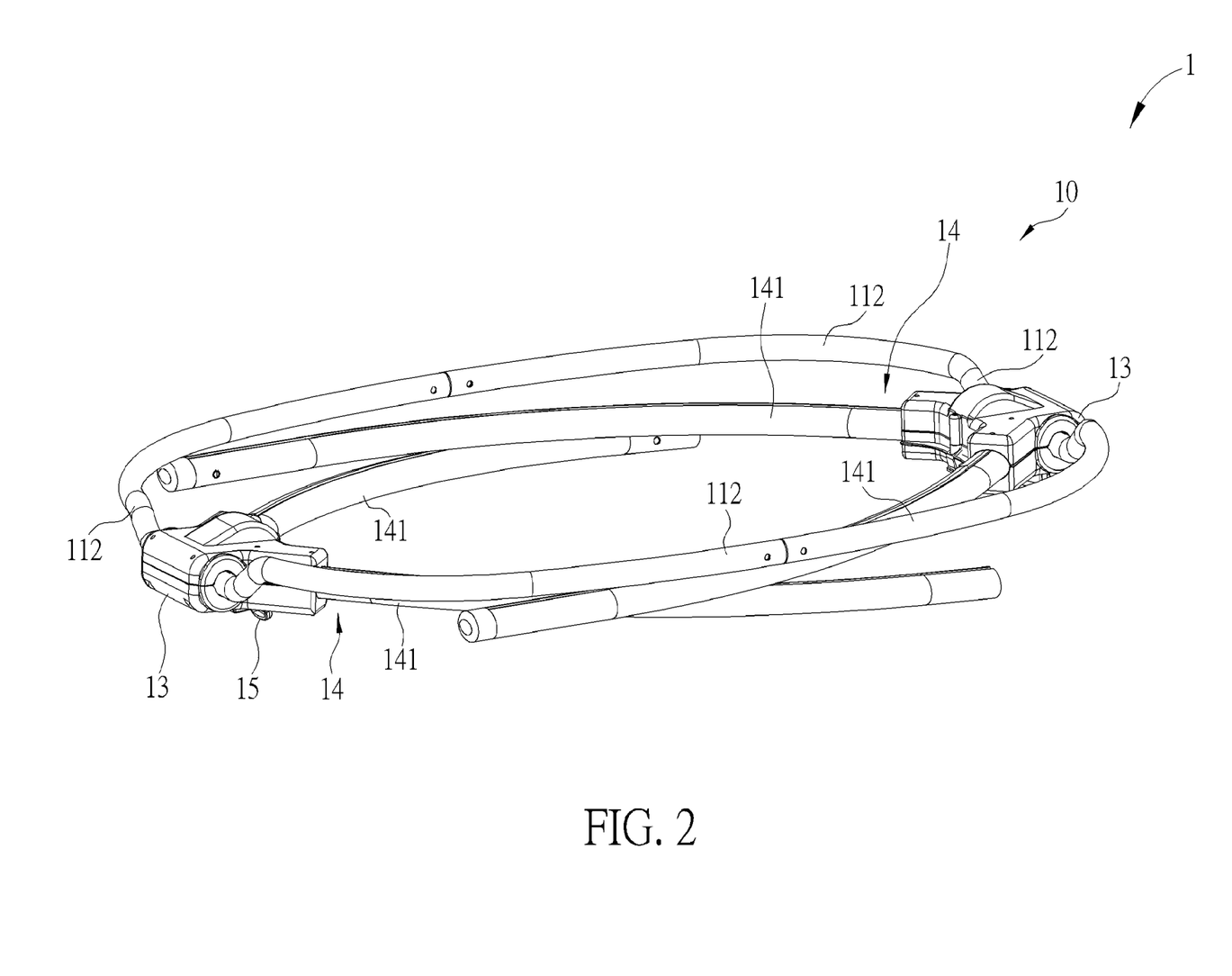
FIG. 2 is a partial diagram of the foldable bassinet in a folded state according to the first embodiment of the present invention.
Figure 3:
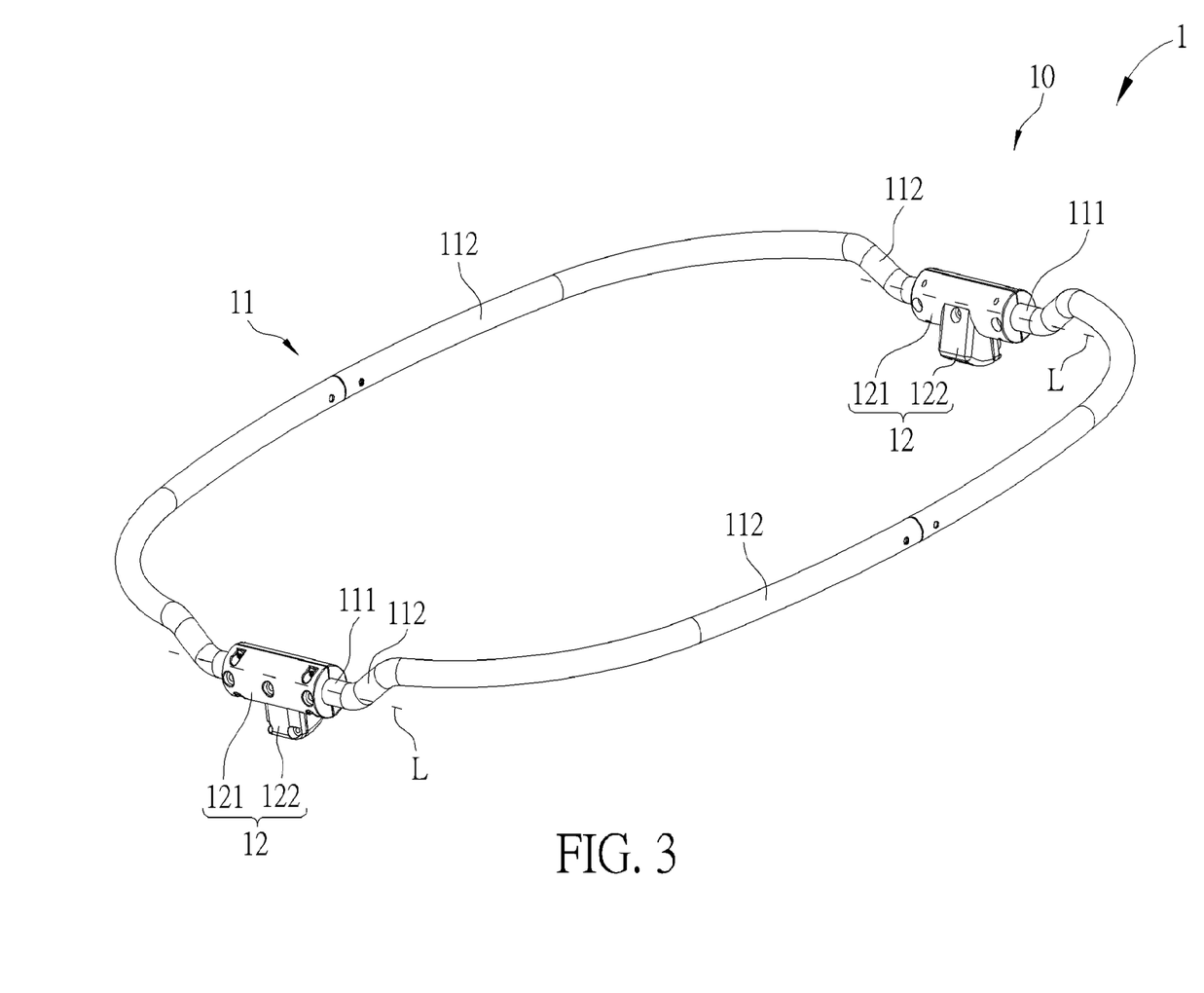
FIG. 3 is a partial diagram of the foldable bassinet according to the first embodiment of the present invention.
Figure 4:
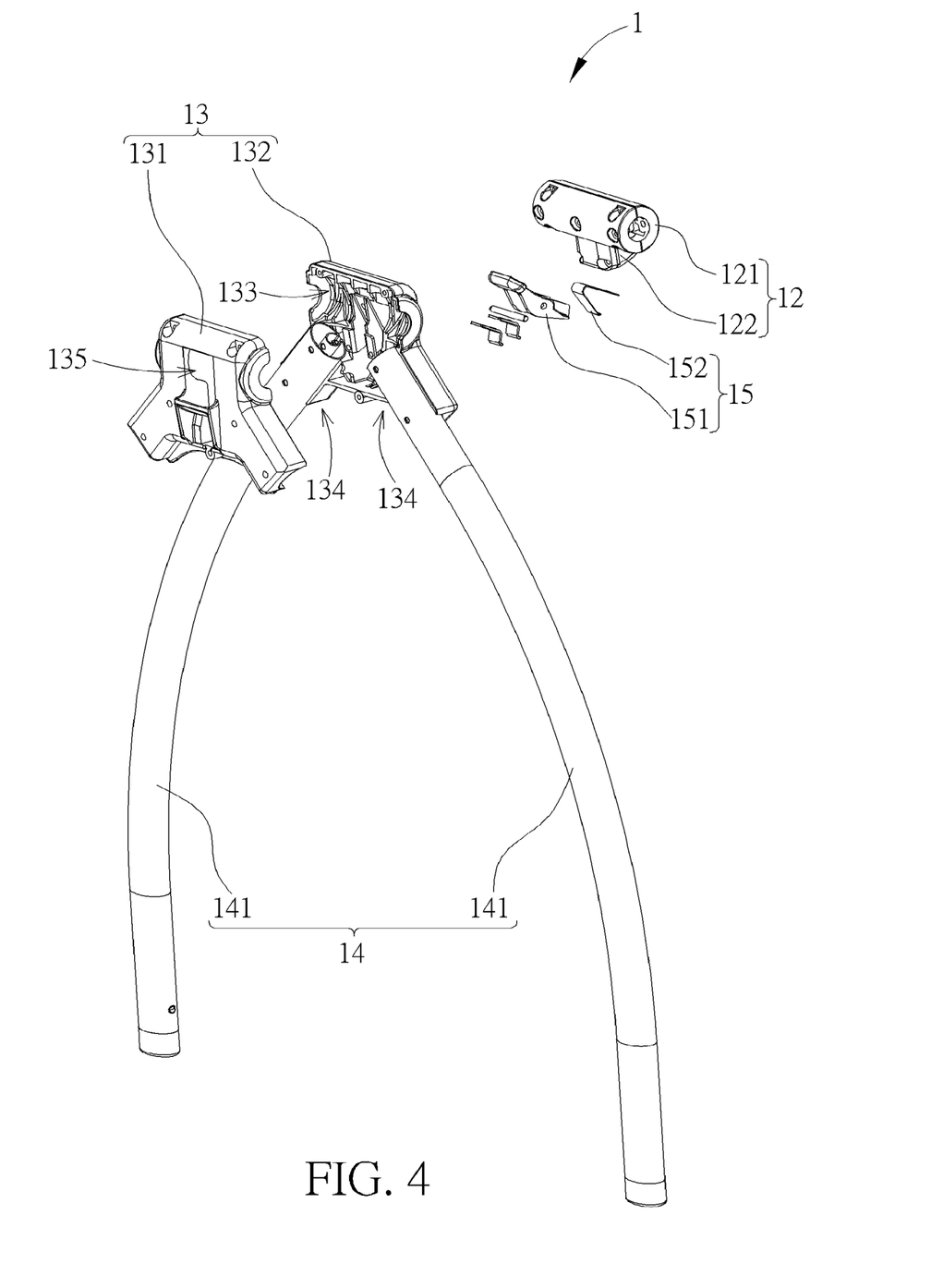
FIG. 4 is a partial exploded diagram of the foldable bassinet according to the first embodiment of the present invention.

Please refer to FIG. 1 to FIG. 4. FIG. 1 is a schematic diagram of a foldable bassinet 1 in an unfolded state according to a first embodiment of the present invention. FIG. 2 is a partial diagram of the foldable bassinet 1 in a folded state according to the first embodiment of the present invention. FIG. 3 is a partial diagram of the foldable bassinet 1 according to the first embodiment of the present invention. FIG. 4 is a partial exploded diagram of the foldable bassinet 1 according to the first embodiment of the present invention. As shown in FIG. 1 to FIG. 4, the foldable bassinet 1 includes a frame 10 and a soft good, which is not shown in figures. The frame 10 includes a top rail assembly 11, two first hinge assemblies 12, two second hinge assemblies 13, two leg assemblies 14 and two latch assemblies 15. The two first hinge assemblies 12 are detachably combined with two opposite sides of the top rail assembly 11. Each second hinge assembly 13 is detachably and rotatably combined with the corresponding first hinge assembly 12, and each leg assembly 14 is detachably connected to the corresponding second hinge assembly 13. That is, each leg assembly 14 is assembled with the top rail assembly 11 by the corresponding first hinge assembly 12 and the corresponding second hinge assembly 13 and foldable relative to the top rail assembly 11 by rotation of the corresponding second hinge assembly 13 relative to the corresponding first hinge assembly 12. Each latch assembly 15 is movably disposed on the corresponding second hinge assembly 13 to engage with the corresponding first hinge assembly 12 for restraining the rotation of the corresponding second hinge assembly 13 relative to the corresponding first hinge assembly 12. The soft good is secured to the top rail assembly 11 and the two leg assemblies 14 and can be a cloth component or a fabric component for providing a sleeping area for a child.

However, the structure of the foldable bassinet of the present invention is not limited to this embodiment. For example, in another embodiment, the latch assembly can be movably disposed on the first hinge assembly to engage the second hinge assembly for restraining the rotation of the second hinge assembly relative to the first hinge assembly. Alternatively, in another embodiment, the foldable bassinet also can include one first hinge assembly, one second hinge assembly, one leg assembly and one latch assembly at one side of the top rail assembly.

In this embodiment, the top rail assembly 11 includes four tube components 112. Two hinge sections 111 are respectively formed on central portions of two of the four tube components 112 opposite to each other. Each hinge section 111 is sheathed in and tightly fitted with the corresponding first hinge assembly 12. Each leg assembly 14 includes two leg components 141 separated from each other. However, it is not limited thereto. For example, in another embodiment, the two leg components 141 can be connected to each other to form a U-shaped structure. Each second hinge assembly 13 includes a first outer housing 131 and a second outer housing 132 detachably connected to the first outer housing 131. A first receiving chamber 133 and two second receiving chambers 134 are formed between the first outer housing 131 and the second outer housing 132. Each first hinge assembly 12 is rotatably received inside the corresponding first receiving chamber 133. Upper ends of the two leg components 141 are received inside the corresponding second receiving chambers 134, respectively.

Figure 5:
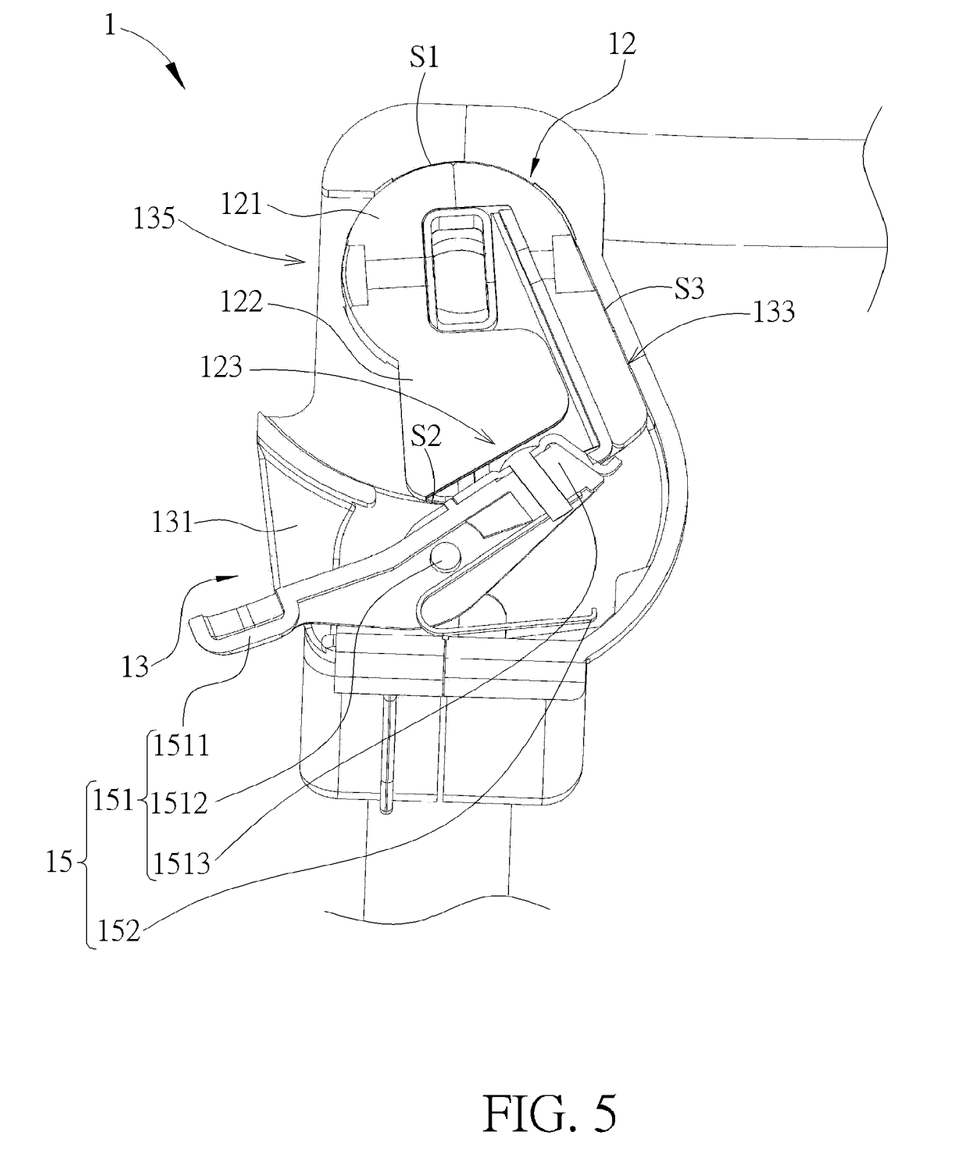
FIG. 5 is a partial sectional diagram of the foldable bassinet in the unfolded state as the latch assembly is at a locking position according to the first embodiment of the present invention.
Figure 6:
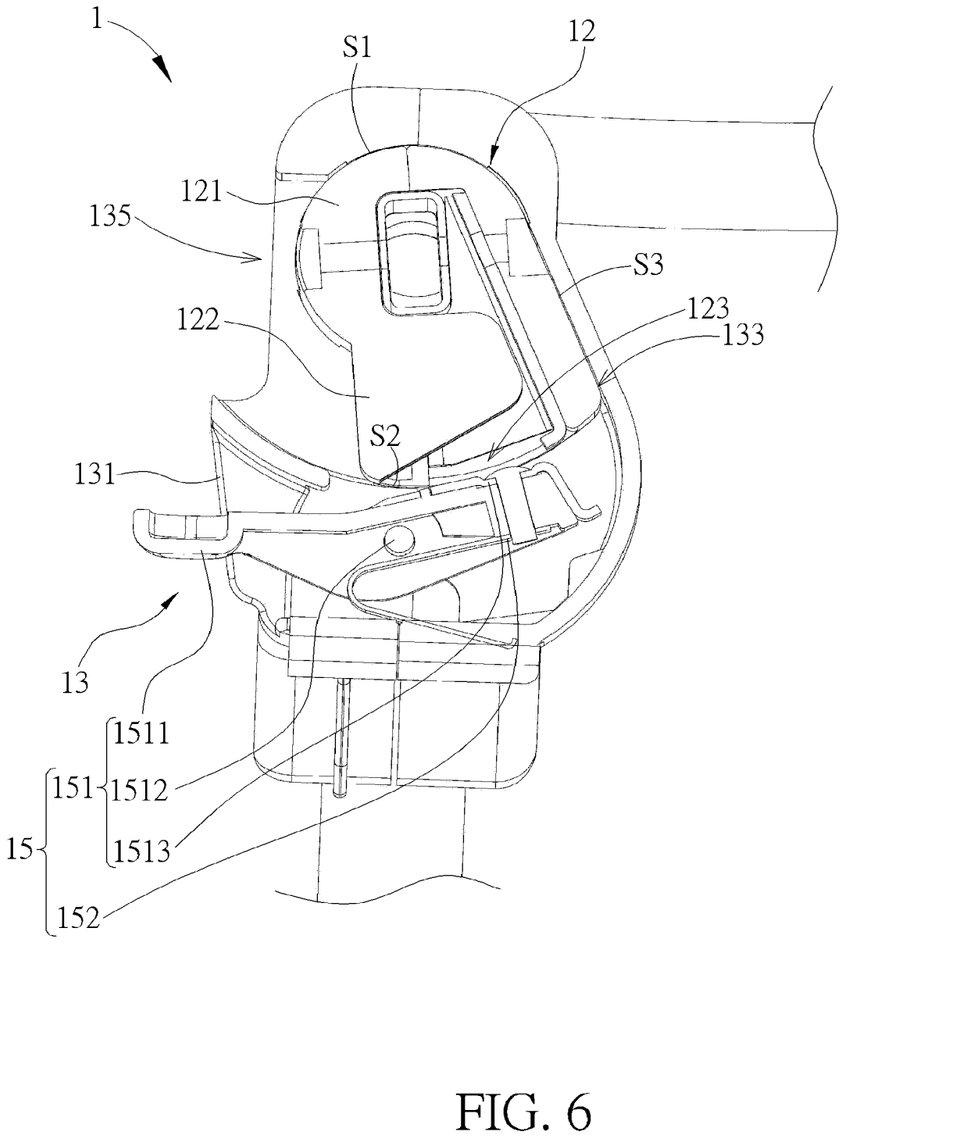
FIG. 6 is a partial sectional diagram of the foldable bassinet in the unfolded state as the latch assembly is at a releasing position according to the first embodiment of the present invention.
Figure 7:
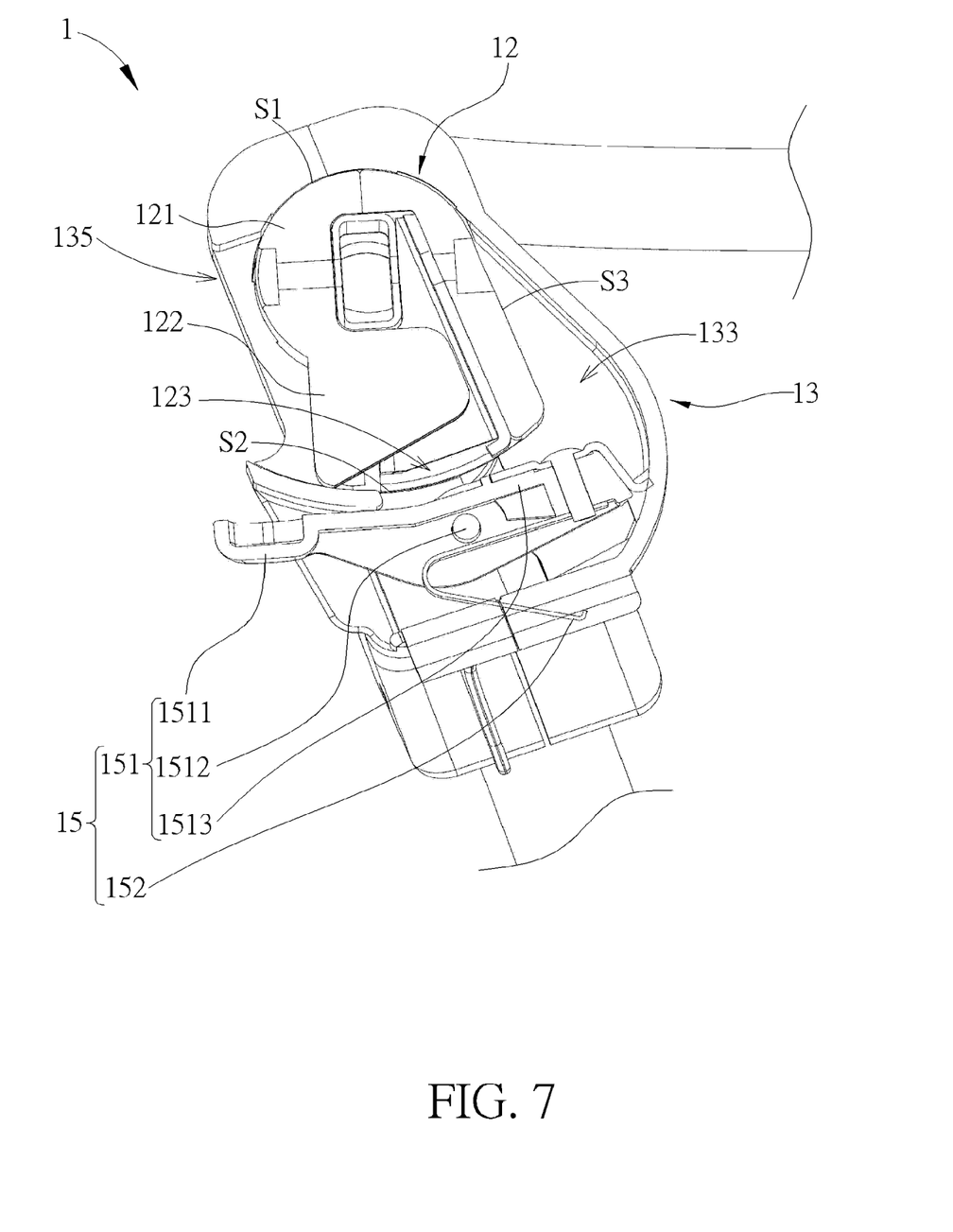
FIG. 7 is a partial sectional diagram of the foldable bassinet in a semi-folded state according to the first embodiment of the present invention.

Specifically, please refer to FIG. 3 to FIG. 7. FIG. 5 is a partial sectional diagram of the foldable bassinet 1 in the unfolded state as the latch assembly 15 is at a locking position according to the first embodiment of the present invention. FIG. 6 is a partial sectional diagram of the foldable bassinet 1 in the unfolded state as the latch assembly 15 is at a releasing position according to the first embodiment of the present invention. FIG. 7 is a partial sectional diagram of the foldable bassinet 1 in a semi-folded state according to the first embodiment of the present invention. As shown in FIG. 3 to FIG. 7, each hinge section 111 includes a longitudinal axis L. An interface surface of each first hinge assembly 12 and an interface surface of the corresponding first receiving chamber 133 are formed in arc shapes around the longitudinal axis L of the corresponding hinge section 111 and contact with each other, so that each second hinge assembly 13 is rotatable relative to the corresponding first hinge assembly 12 around the corresponding longitudinal axis L by cooperation of the corresponding interface surfaces when each first hinge assembly 12 is received inside the corresponding first receiving chamber 133. Furthermore, an abutting surface of each first hinge assembly 12 abuts against an abutting surface of the corresponding first receiving chamber 133 when the corresponding leg assembly 14 is unfolded relative to the top rail assembly 11 to an upright position.

Furthermore, each first hinge assembly 12 includes a first portion 121 having a first radius relative to the longitudinal axis L and a second portion 122 having a second radius relative to the longitudinal axis L, and the second radius is greater than the first radius. The interface surface of each first hinge assembly 12 is formed by a portion of a peripheral surface S1 of the first portion 121 and a portion of a peripheral surface S2 of the second portion 122, and the abutting surface of each first hinge assembly 12 is formed by a slanted surface S3 of the second portion 122 for abutting against the abutting surface of the corresponding first receiving chamber 133. An exposing window 135 is formed on each first outer housing 131 and communicated with the corresponding first receiving chamber 133, and each second portion 122 is exposed out of the corresponding exposing window 135 when the corresponding leg assembly 14 is folded relative to the top rail assembly 11 to a folded position. However, it is not limited to this embodiment. For example, the first hinge assembly also can be a circular cylinder structure around the longitudinal axis, i.e., the first hinge assembly has a constant radius, and there is no exposing window formed on the first outer housing.

Besides, an engaging recess 123 is formed on each first hinge assembly 12. Each latch assembly 15 includes an engaging component 151 pivotally disposed on the corresponding second hinge assembly 13 for engaging with the corresponding engaging recess 123, and each latch assembly 15 further includes a recovering component 152 abutting between the corresponding second hinge assembly 13 and the corresponding engaging component 151 to bias the corresponding engaging component 151 to engage with the corresponding engaging recess. Specifically, the engaging recess 123 is formed on the second portion 122 of each first hinge assembly 12. The engaging component 151 includes an operating portion 1511, a pivoting portion 1512 and an engaging portion 1513. Each pivoting portion 1512 is connected to and located between the corresponding operating portion 1511 and the corresponding engaging portion 1513. Each pivoting portion 1512 is pivoted to the corresponding second hinge assembly 13. Each operating portion 1511 is at least partially exposed out of the corresponding second hinge assembly 13 and is configured to be operated to pivot the corresponding pivoting portion 1512 so as to drive the corresponding engaging portion 1513 to engage with or disengage from the corresponding engaging recess 123. In this embodiment, the recovering component 152 can preferably be a compression spring, such as a leaf spring. However, it is not limited thereto.

Operational principle of the foldable bassinet 1 is described as follows. When it is desired to switch the foldable bassinet 1 from the unfolded state shown in FIG. 1 to the folded state shown in FIG. 2, a caregiver can operate the operating portions 1511 of the engaging components 151 of the two latch assemblies 15 at the same time to drive the engaging portions 1513 of the engaging components 151 of the two latch assemblies 15 to move from the locking positions shown in FIG. 5 to the releasing positions shown in FIG. 6 for pivotally disengaging from the two engaging recesses 123, which allows the rotation of the two second hinge assemblies 13 relative to the two first hinge assemblies 12. Afterwards, the two leg assemblies 14 can be folded toward each other and relative to the top rail assembly 11 to the folded positions as shown in FIG. 2 by the rotation of the two second hinge assemblies 13 relative to the two first hinge assemblies 12. However, it is limited to thereto. The operating portions 1511 of the engaging components 151 of the two latch assemblies 15 also can be operated to fold the two leg assemblies 14 one by one.

Furthermore, when it is desired to switch the foldable bassinet 1 from the folded state shown in FIG. 2 to the unfolded state shown in FIG. 1, the caregiver can directly unfold the two leg assemblies 14 away from each other and relative to the top rail assembly 11 until the abutting surfaces of the two first hinge assemblies 12 and the two first receiving chambers 133 abut against each other. At this moment, the two leg assemblies 14 are at the upright positions, and the two engaging recesses 123 are aligned with the engaging portions 1513 of the engaging components 151 of the two latch assemblies 15 respectively. Therefore, the two compressed recovering components 152 can drive the engaging portions 1513 of the engaging components 151 of the two latch assemblies 15 to engage with the two engaging recesses 123 to restrain the rotation of the two second hinge assemblies 13 relative to the two first hinge assemblies 12, which prevents the two leg assemblies 15 from leaving away from the upright positions toward the folded positions.

Figure 8:
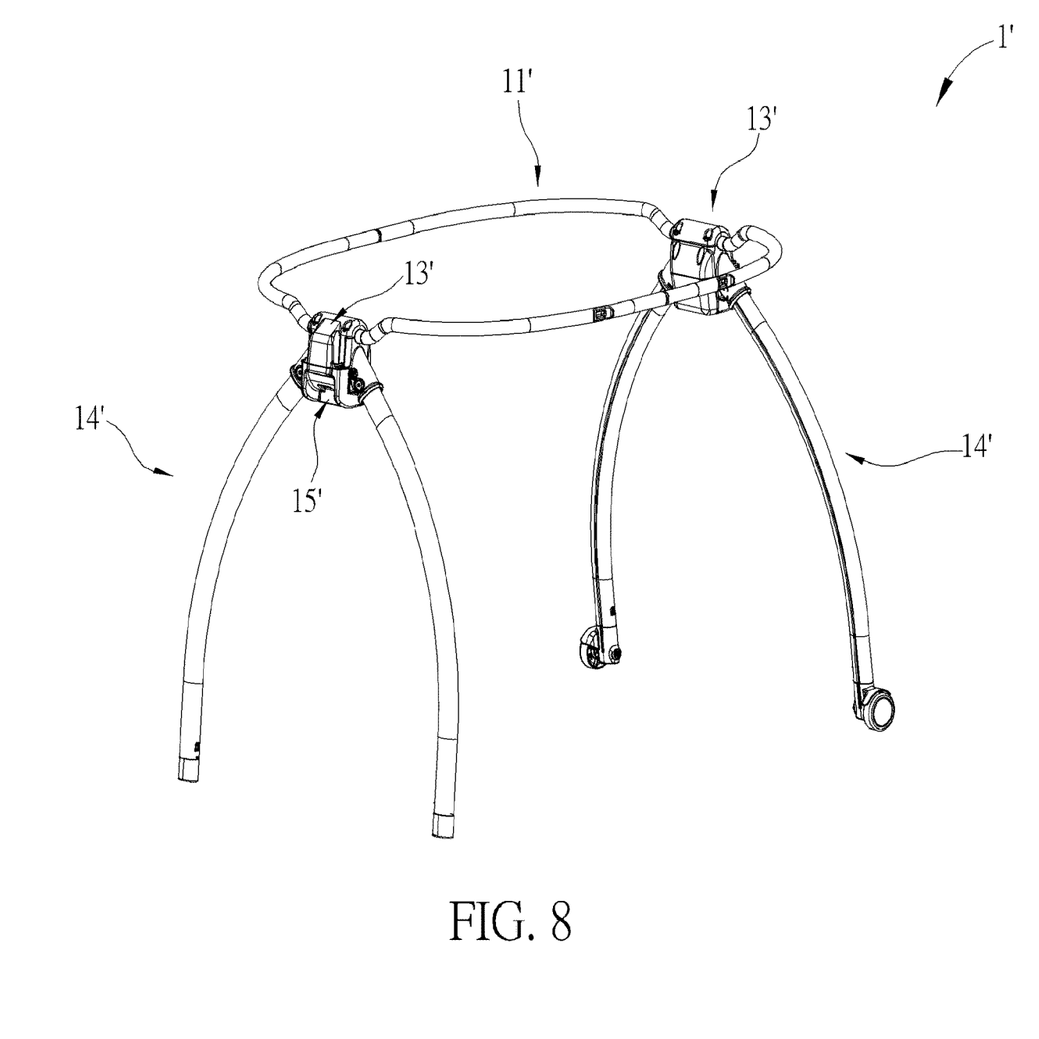
FIG. 8 is a schematic diagram of a foldable bassinet in an unfolded state according to a second embodiment of the present invention.
Figure 9:
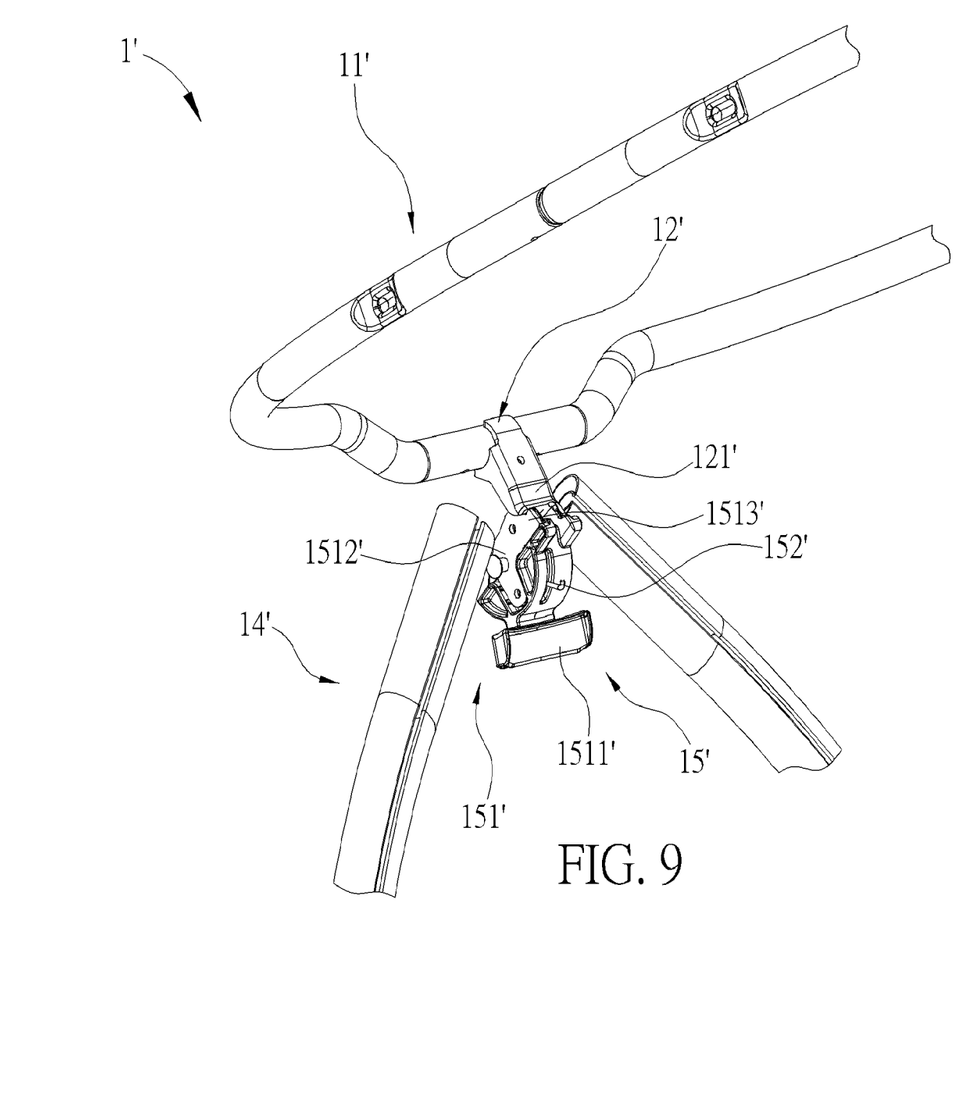
FIG. 9 is a partial diagram of the foldable bassinet according to the second embodiment of the present invention.
Figure 10:
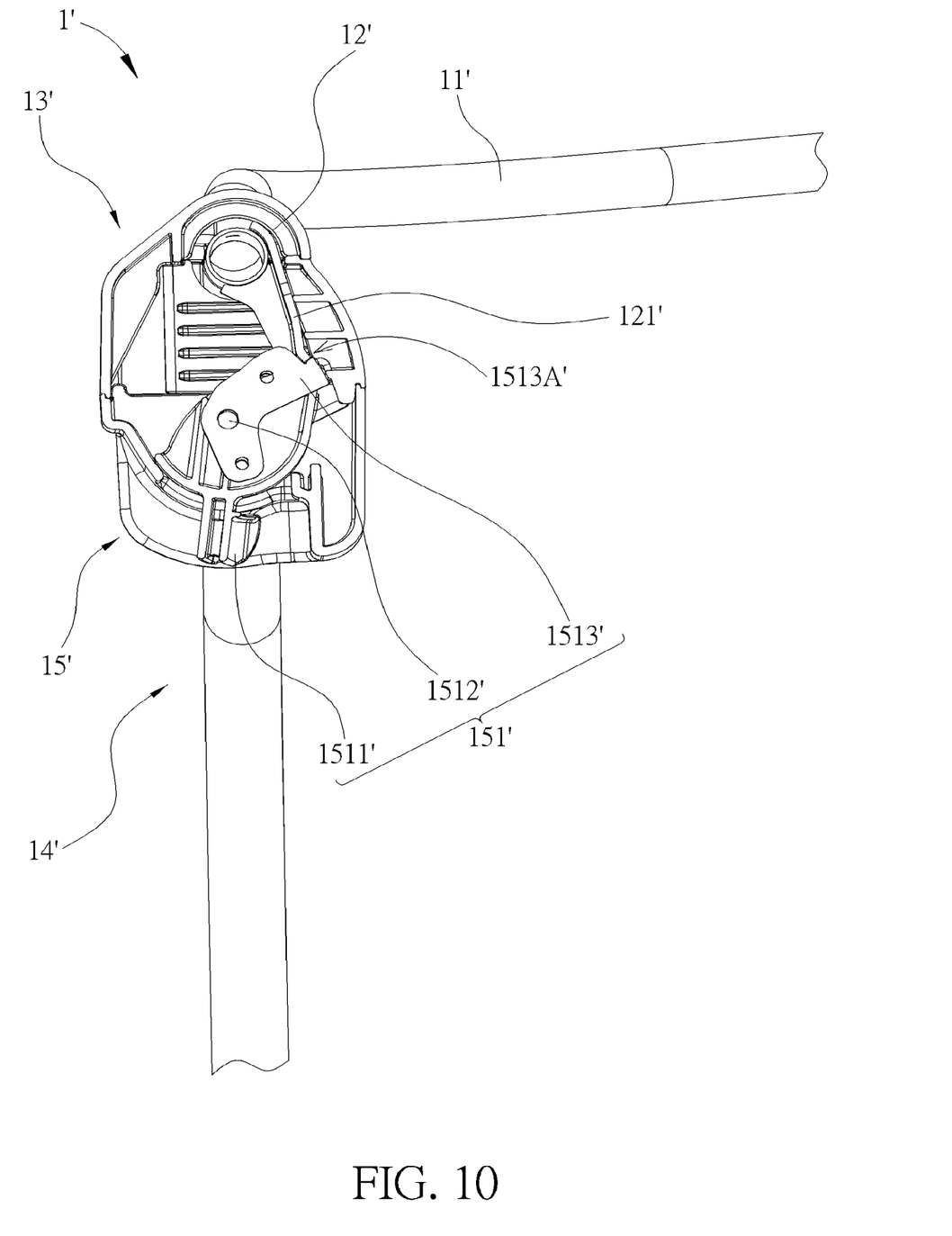
FIG. 10 is a partial sectional diagram of the foldable bassinet according to the second embodiment of the present invention.

Please refer to FIG. 8 to FIG. 10. FIG. 8 is a schematic diagram of a foldable bassinet 1' in an unfolded state according to a second embodiment of the present invention. FIG. 9 is a partial diagram of the foldable bassinet 1' according to the second embodiment of the present invention. FIG. 10 is a partial sectional diagram of the foldable bassinet 1' according to the second embodiment of the present invention. As shown in FIG. 8 to FIG. 10, the foldable bassinet 1' includes a top rail assembly 11', two first hinge assemblies 12', two second hinge assemblies 13', two leg assemblies 14' and two latch assemblies 15'. An engaging protrusion 121' protrudes from each first hinge assembly 12'. Each latch assembly 15' includes an engaging component 151' pivotally disposed on the corresponding second hinge assembly 13' for engaging with the engaging protrusion 121', and each latch assembly 15' further includes a recovering component 152' abutting between the corresponding second hinge assembly 13' and the corresponding engaging component 151' to bias the corresponding engaging component 151' to engage with the corresponding engaging protrusion 121'. Specifically, the engaging component 151' of this embodiment includes an operating portion 1511', a pivoting portion 1512' and an engaging portion 1513'. The pivoting portion 1512' is connected to and located between the corresponding operating portion 1511' and the corresponding engaging portion 1513'. The corresponding pivoting portion 1512' is pivoted to the corresponding second hinge assembly 13'. An engaging notch 1513A' is formed on the engaging portion 1513' for engaging with the corresponding engaging protrusion 121'. The operating portion 1511' is at least partially exposed out of the corresponding second hinge assembly 13' and is configured to be operated to pivot the corresponding pivoting portion 1512' so as to drive the corresponding engaging notch 1513A' to engage with or disengage from the corresponding engaging protrusion 121'. Furthermore, in this embodiment, the recovering component 152' can preferably be a compression spring, such as a torsional spring. However, it is not limited thereto.

Figure 11:
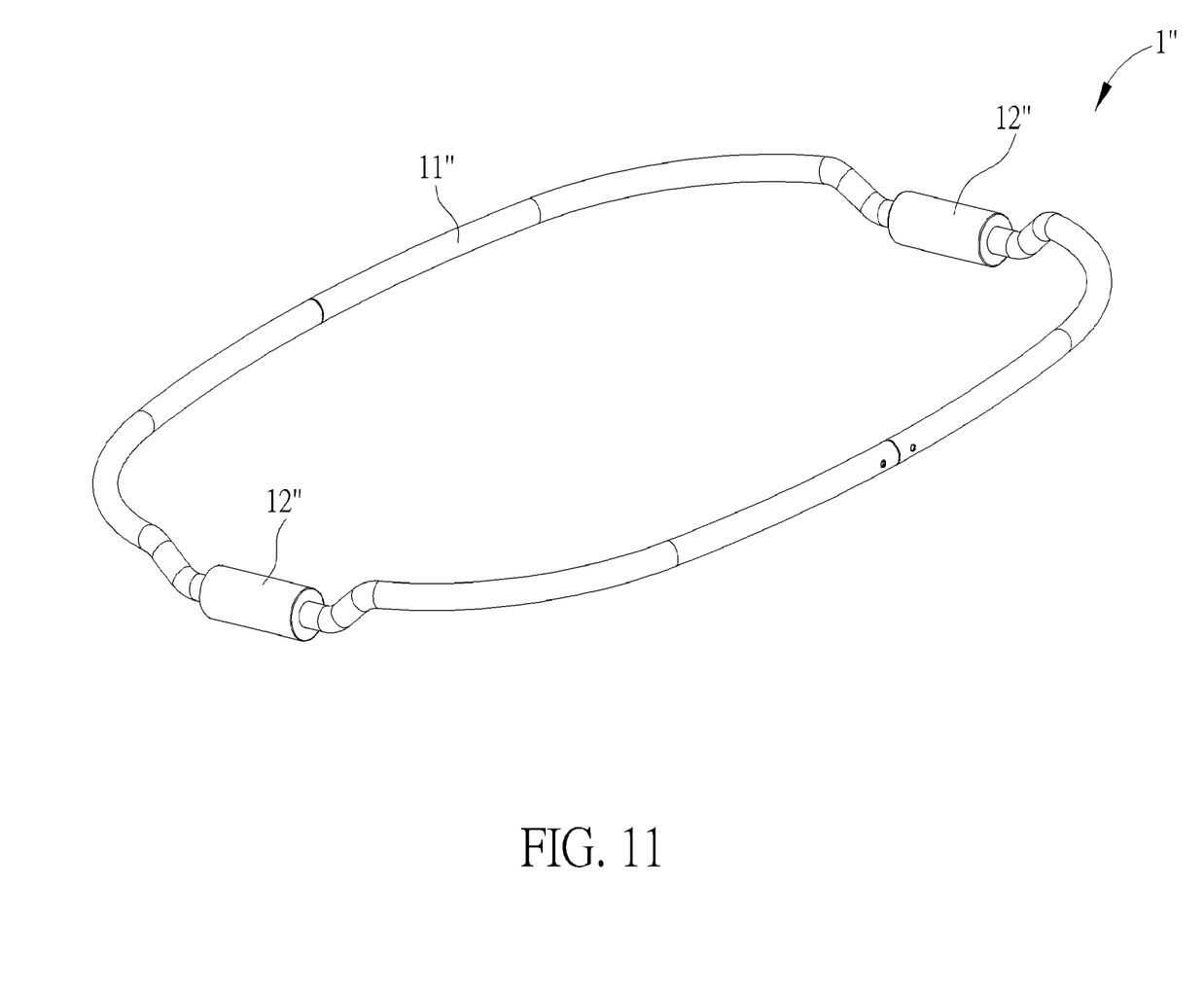
FIG. 11 is a partial diagram of a foldable bassinet according to a third embodiment of the present invention.

FIG. 11 is a partial diagram of a foldable bassinet 1" according to a third embodiment of the present invention. As shown in FIG. 11, different from the aforementioned embodiments, the foldable bassinet 1" includes a top rail assembly 11" and two first hinge assemblies 12", and the two first hinge assemblies 12" and the top rail assembly 11" are combined with each other to form an integral structure.

In contrast to the prior art, the present invention utilizes the first hinge assembly and the second hinge assembly to connect the two leg components of the leg assembly to the top rail assembly. Therefore, the two leg components of the leg assembly can be folded relative to the top tail assembly together by the rotation of the second hinge assembly relative to the first hinge assembly, which effectively prevents a soft good from forming a triangle which resists a folding action of the leg assembly and brings convenience in use. Besides, the present invention further utilizes the latch assembly to restrain or allow the rotation of the second hinge assembly relative to the first hinge assembly. Therefore, it allows a caregiver to fold the two leg components of the leg assembly easily by operating the latch assembly, which brings convenience in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A foldable bassinet comprising:
 a top rail assembly;
 at least one first hinge assembly disposed about the top rail assembly, the at least one first hinge assembly including an engaging surface;
 at least one second hinge assembly rotatably combined with the at least one first hinge assembly;
 at least one leg assembly connected to the at least one second hinge assembly, the at least one leg assembly being foldable relative to the top rail assembly by rotation of the at least one second hinge assembly relative to the at least one first hinge assembly; and
 at least one latch assembly movably disposed on the at least one second hinge assembly, the at least one latch assembly comprising an engaging component movably connected to the at least one second hinge assembly, the engaging component directly contacting the engaging surface to restrain the rotation of the at least one second hinge assembly relative to the at least one first hinge assembly when the at least one leg assembly is unfolded relative to the top rail assembly to an upright position.

2. The foldable bassinet of claim 1, wherein the engaging component is pivotally connected to the at least one second hinge assembly.

3. The foldable bassinet of claim 1, wherein the engaging surface is an engaging recess.

4. The foldable bassinet of claim 1, wherein the engaging surface is an engaging protrusion protruding from the at least one first hinge assembly.

5. The foldable bassinet of claim 4, wherein the engaging component comprises an operating portion, a pivoting portion and an engaging portion, the pivoting portion is connected to and located between the operating portion and the engaging portion, the pivoting portion is pivotally connected to the at least one second hinge assembly, an engaging notch is formed on the engaging portion, the operating portion is at least partially exposed out of the at least one second hinge assembly, and the operating portion is configured to be operated to pivot the pivoting portion so as to drive the engaging notch to engage with or disengage from the engaging protrusion.

6. The foldable bassinet of claim 1, wherein the at least one latch assembly further comprises a recovering component abutting between the at least one second hinge assembly and the engaging component to bias the engaging component to engage with the engaging surface.

7. The foldable bassinet of claim 6, wherein the recovering component is a torsional spring.

8. The foldable bassinet of claim 1, wherein the at least one first hinge assembly is received inside the at least one second hinge assembly.

9. The foldable bassinet of claim 8, wherein the at least one second hinge assembly comprises a first outer housing and a second outer housing detachably connected to the first outer housing, a first receiving chamber is formed between the first outer housing and the second outer housing, and the at least one first hinge assembly is received inside the first receiving chamber.

10. The foldable bassinet of claim 9, wherein at least one hinge section is formed on the top rail assembly and comprises a longitudinal axis, the at least one hinge section is sheathed in the at least one first hinge assembly, and the at least one second hinge assembly is rotatable relative to the at least one first hinge assembly around the longitudinal axis.

11. The foldable bassinet of claim 10, wherein an interface surface of the first receiving chamber and an interface surface of the at least one first hinge assembly are formed in arc shapes around the longitudinal axis and contact with each other.

12. The foldable bassinet of claim 9, wherein an abutting surface of the first receiving chamber abuts against an abutting surface of the at least one first hinge assembly when the at least one leg assembly is unfolded relative to the top rail assembly to the upright position.

13. The foldable bassinet of claim 9, wherein the at least one first hinge assembly comprises a first portion having a first radius and a second portion having a second radius greater than the first radius, an exposing window is formed on the first outer housing and communicated with the first receiving chamber, the second portion is exposed out of the exposing window when the at least one leg assembly is folded relative to the top rail assembly to a folded position.

14. The foldable bassinet of claim 1, wherein the at least one second hinge assembly comprises a first outer housing and a second outer housing detachably connected to the first outer housing, a first receiving chamber and at least one second receiving chamber are formed between the first outer housing and the second outer housing, the at least one first hinge assembly is received inside the first receiving chamber, and the at least one leg assembly is received inside the at least one second receiving chamber.

15. The foldable bassinet of claim 1, wherein the at least one first hinge assembly and the top rail assembly are combined with each other to cooperatively form an integral structure.

16. A foldable bassinet comprising:
a top rail assembly;
at least one first hinge assembly disposed on the top rail assembly, the at least one first hinge assembly including an engaging surface;
at least one second hinge assembly rotatably combined with the at least one first hinge assembly;
at least one leg assembly connected to the at least one second hinge assembly, the at least one leg assembly being foldable relative to the top rail assembly by rotation of the at least one second hinge assembly relative to the at least one first hinge assembly; and
at least one latch assembly pivotally connected to one of the at least one first hinge assembly and the at least one second hinge assembly to engage with the other one of the at least one first hinge assembly and the at least one second hinge assembly, the at least one latch assembly comprising an engaging component to engage with the engaging surface to restrain the rotation of the at least one second hinge assembly relative to the at least one first hinge assembly when the at least one leg assembly is unfolded relative to the top rail assembly to an upright position, the engaging component comprising a pivoting portion, an operating portion, and an engaging portion, the pivoting portion pivotally connected to the one of the at least one first hinge assembly and the at least one second hinge assembly, the engaging portion is configured to directly contact the engaging surface, and the operating portion is configured to be operated to pivot the pivoting portion so as to drive the engaging portion to engage with or disengage from the engaging surface.

17. The foldable bassinet of claim 16, wherein the at least one latch assembly is pivotally connected to the at least one second hinge assembly.

18. The foldable bassinet of claim 16, wherein the engaging surface is an engaging recess.

19. The foldable bassinet of claim 16, wherein the engaging surface is an engaging protrusion protruding from the at least one first hinge assembly, and the engaging portion defines a notch to engage with or disengage from the engaging protrusion.

20. A method of folding a bassinet, the method comprising:
providing the bassinet comprising:
a top rail assembly;
at least one first hinge assembly disposed on the top rail assembly, the at least one first hinge assembly including an engaging surface;
at least one second hinge assembly rotatably combined with the at least one first hinge assembly;
at least one leg assembly connected to the at least one second hinge assembly; and
at least one latch assembly movably disposed on the at least one second hinge assembly, the at least one latch assembly comprising an engaging component movably connected to the at least one second hinge assembly, the the engaging component directly contacting the engaging surface to restrain the rotation of the at least one second hinge assembly relative to the at least one first hinge assembly when the at least one leg assembly is unfolded relative to the top rail assembly to an upright position;
operating the engaging component to release the engagement between the engaging component and the engaging surface; and
rotating the second hinge assembly relative to the first hinge assembly to rotate the at least one leg assembly to a folded position.

* * * * *